US008090699B2

(12) United States Patent
Pousti et al.

(10) Patent No.: US 8,090,699 B2
(45) Date of Patent: Jan. 3, 2012

(54) AUTOMATIC GENERATION OF APPLICATION POD

(75) Inventors: Michael Pousti, San Diego, CA (US);
Andrew Michael Ballester, San Diego, CA (US); Szeying Tan, San Diego, CA (US)

(73) Assignee: SMS.ac, Inc., San Diego, CA (US)

( * ) Notice: Subject to any disclaimer, the term of this patent is extended or adjusted under 35 U.S.C. 154(b) by 83 days.

(21) Appl. No.: 11/715,401

(22) Filed: Mar. 8, 2007

(65) Prior Publication Data
US 2007/0266034 A1 Nov. 15, 2007

Related U.S. Application Data

(63) Continuation-in-part of application No. 11/516,921, filed on Sep. 6, 2006, now Pat. No. 7,826,829.

(60) Provisional application No. 60/780,736, filed on Mar. 8, 2006.

(51) Int. Cl.
*G06F 17/30* (2006.01)
(52) U.S. Cl. ........................... 707/705; 709/217
(58) Field of Classification Search ............ 707/10, 707/705, 999.01; 709/217
See application file for complete search history.

(56) References Cited

U.S. PATENT DOCUMENTS

| | | | | |
|---|---|---|---|---|
| 5,884,312 A | * | 3/1999 | Dustan et al. ............ | 707/10 |
| 6,338,050 B1 | * | 1/2002 | Conklin et al. ............ | 705/80 |
| 6,993,580 B2 | * | 1/2006 | Isherwood et al. ......... | 709/225 |
| 7,222,109 B1 | * | 5/2007 | Flanagan et al. ........... | 705/80 |
| 7,433,876 B2 | * | 10/2008 | Spivack et al. ............ | 707/100 |
| 7,467,391 B2 | * | 12/2008 | Myllymaki et al. ......... | 719/320 |
| 7,599,983 B2 | * | 10/2009 | Harper et al. ............. | 709/200 |
| 7,752,313 B2 | * | 7/2010 | Adelman et al. ........... | 709/226 |
| 2002/0013947 A1 | * | 1/2002 | Russell et al. ............ | 725/90 |
| 2002/0037708 A1 | * | 3/2002 | McCann et al. ............ | 455/411 |
| 2002/0069263 A1 | * | 6/2002 | Sears et al. .............. | 709/218 |
| 2002/0073089 A1 | * | 6/2002 | Schwartz et al. .......... | 707/10 |
| 2002/0078203 A1 | * | 6/2002 | Greschler et al. ......... | 709/225 |
| 2002/0095399 A1 | * | 7/2002 | Devine et al. ............ | 707/1 |
| 2002/0107920 A1 | * | 8/2002 | Hotti .................... | 709/204 |
| 2002/0112237 A1 | * | 8/2002 | Kelts .................... | 725/39 |
| 2003/0014477 A1 | * | 1/2003 | Oppenheimer et al. ...... | 709/203 |
| 2003/0033357 A1 | * | 2/2003 | Tran et al. .............. | 709/203 |
| 2004/0054632 A1 | | 3/2004 | Remy .................... | 705/64 |
| 2004/0088369 A1 | * | 5/2004 | Yeager et al. ............ | 709/217 |
| 2004/0105424 A1 | * | 6/2004 | Skoczkowski et al. ...... | 370/352 |
| 2004/0110497 A1 | * | 6/2004 | Little ................... | 455/418 |
| 2005/0097440 A1 | * | 5/2005 | Lusk et al. .............. | 715/500.1 |
| 2005/0193054 A1 | * | 9/2005 | Wilson et al. ............ | 709/200 |
| 2005/0228876 A1 | * | 10/2005 | Malik ................... | 709/223 |
| 2006/0020783 A1 | | 1/2006 | Fisher .................. | 713/156 |

(Continued)

OTHER PUBLICATIONS

International Search Report for PCT/US07/85643 mailed May 13, 2008.

(Continued)

*Primary Examiner* — Hung T Vy
*Assistant Examiner* — Phuong Thao Cao
(74) *Attorney, Agent, or Firm* — Procopio, Cory, Hargreaves & Savitch LLP; Noel C. Gillespie; Jonathan D. Cheng

(57) ABSTRACT

Systems and methods are disclosed for automatically uploading information about a program or blog, and allowing third parties to develop the program or blog and allow users in a mobile community to have access to the developed product.

28 Claims, 9 Drawing Sheets

U.S. PATENT DOCUMENTS

| | | | | |
|---|---|---|---|---|
| 2006/0041632 | A1* | 2/2006 | Shah et al. | 709/217 |
| 2006/0080238 | A1 | 4/2006 | Nielsen | 705/40 |
| 2006/0123010 | A1* | 6/2006 | Landry et al. | 707/10 |
| 2006/0150152 | A1* | 7/2006 | Soini et al. | 717/116 |
| 2006/0173784 | A1* | 8/2006 | Marples et al. | 705/52 |
| 2006/0184679 | A1* | 8/2006 | Izdepski et al. | 709/229 |
| 2006/0230415 | A1* | 10/2006 | Roeding | 725/34 |
| 2006/0235796 | A1 | 10/2006 | Johnson et al. | 705/44 |
| 2006/0259852 | A1* | 11/2006 | Upendran et al. | 715/500.1 |
| 2006/0277144 | A1 | 12/2006 | Ranzini et al. | 705/39 |
| 2007/0038567 | A1* | 2/2007 | Allaire et al. | 705/50 |
| 2007/0156600 | A1* | 7/2007 | Kawai et al. | 705/52 |
| 2007/0300152 | A1* | 12/2007 | Baugher | 715/522 |
| 2008/0004043 | A1* | 1/2008 | Wilson et al. | 455/456.3 |
| 2009/0043798 | A1* | 2/2009 | Tan et al. | 707/102 |

OTHER PUBLICATIONS

Notice of Allowance mailed Aug. 23, 2010 in related U.S. Appl. No. 11/516,921 (12 pages).

Supplemental Response to Office Action filed Jul. 13, 2010 in related U.S. Appl. No. 11/516,921 (33 pages).

Notice of Allowance mailed Aug. 25, 2010 in related U.S. Appl. No. 12/620,507 (11 pages).

Response to Office Action filed Jul. 15, 2010 in related U.S. Appl. No. 12/620,507 (19 pages).

Notice of Allowance mailed Sep. 7, 2010 in related U.S. Appl. No. 11/688,584 (17 pages).

* cited by examiner

AUTOMATIC GENERATION OF APPLICATION POD

This application claims priority to U.S. Provisional Patent Application Ser. No. 60/780,736, filed Mar. 8, 2006; and is a Continuation-In-Part (CIP) of U.S. patent application Ser. No. 11/516,921, filed Sept. 6, 2006, now patented as U.S. Pat. No. 7,826,829, issued on Nov. 2, 2010, the contents of both of which are hereby incorporated by reference in their entirety into this disclosure.

BACKGROUND OF THE INVENTION

1. Field of the Invention

The present invention relates to communication systems. More particularly, the present invention relates to systems and methods for allowing a third party to automatically generate an application which contains content provided by the third party for access, purchase and use by users belonging to a community network.

2. Background of the Invention

The advent of instant electronic communication between multiple users anywhere in the world has spurned a new generation of electronic applications that exploit the benefits of such advancement. One such breakthrough technology, which has no prior related art, has been described in the parent application to the present invention, namely, U.S. patent application Ser. No. 11/516,921. This parent application, which is incorporated by reference herein, is directed to a method and platform through which application providers can easily and automatically connect to a common platform in order to offer access and use of their applications to a global community of mobile device users through a variety of different mediums, while automatically charging the user for use of the application through the user's billing account with the cellular carrier to which the user subscribes. In this manner, the platform described in the parent application allows an application provider to commercially offer an application to a community of mobile device users without the need for the application provider to have a contractual agreement with any of the mobile carriers to which the mobile device users respectively subscribe. Furthermore, the platform described in the parent application provides application providers a simple and automatic way to register and present their applications for access, purchase and use by the global community by registering the applications in an automatic fashion that eliminates the need for a lengthy registration processing involving multiple layers of people and procedures.

According to the platform and methods described in the parent application, an application provider can write an application pod and then register the pod with the community platform for automatic access to a community of mobile device users via various mobile device carriers. For example, an application provider may design and develop an application pod that allows a user to view current stock prices for selected stocks in which the user is interested. The application provider would then register the completed "stock price" application pod with the community platform, after which the pod would be available to all mobile device users that are members of the community. A mobile device user could then subscribe to use the "stock price" application pod through the community platform, after which the user could access and use the pod to check stock prices from within a typical web browser on a computer or on the user's mobile device. As mentioned above with respect to the parent application, the community platform automatically charges the user for use of (subscription to) the application pod through the user's existing billing account with the cellular carrier to which the user subscribes.

Some third parties may have content, such as a blog, music, video, text, or other digital content, that they wish to offer to users of the community platform. However, many such third parties may not be knowledgeable or capable of developing an application pod through which their content can be delivered to the community platform. Other third parties with content to offer may simply not want to expend the time and resources necessary to develop such an application pod. Accordingly, it is desirable to have a method and/or system which allows a third party to offer their content for purchase and use by users of the community platform without requiring the third party to design, develop and implement an application pod.

Thus, there is a need in the communications are for a more convenient and streamlined technique for introducing an application pod to a community of users without the need or inefficiencies of learning to write the program, code or other necessary structure for the application pod to be effective. Such technique should be easy to use and operate and offer a broader range of opportunity for those who desire to use it.

SUMMARY OF THE INVENTION

The present invention generally relates to a technique for automatically generating an application pod for a third party through which the third party's content is offered for access, purchase and use by users within a community network. Such users may be, for example, Internet/web users, mobile telephone users, PDA users or the like.

In this manner, the third party does not need to have the requisite skills and capabilities, time or resources to develop an application pod through which to offer the third party's content, such as a blog, music, video, text, or other digital content, to mobile device users within the community network.

It is understood that other embodiments of the present invention will become readily apparent to those skilled in the art from the following detailed description, wherein is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as being restrictive. For example, as used herein and through the present disclosure, a mobile telephone is used as an example of a mobile device. However, the present invention is not limited to mobile telephones and may also include any other mobile device, including, but not limited to PDAs, pagers, laptops, computers or the like.

In one exemplary embodiment, the present invention is a system for automatically presenting an application to a mobile community. The system includes a server that interacts with entrants, users and programmers; wherein the server allows the entrants to enter information about an application; and wherein the server can pre-arrange the information entered by the users and develop a program that is accessible by the users.

In another exemplary embodiment, the present invention is a system for automatically presenting an application pod to a mobile community. The system includes a server that interacts with entrants, users and programmers; wherein the server allows the entrants to enter information about an application pod; and wherein the server can pre-arrange the information entered by the users and develop a blog that is accessible by the users.

In yet another exemplary embodiment, the present invention is a method for automatically presenting an application to a mobile community. The method includes entering information about an application; and arranging the information entered automatically to develop a program that is accessible by users.

DETAILED DESCRIPTION OF THE INVENTION

The present invention provides for an automated generation of an application pod, which substantially eliminates the need to know and use programming techniques to introduce an application pod to a user community.

To better understand the uniqueness of the present invention, it is helpful to first understand an environment in which it would be most beneficial. Although such environment is presented herein, it should be understood that this environment is only exemplary, and the present invention is not limited to such limiting environment. Many other environments would also be applicable to the present invention, as would be apparent to one having ordinary skill in the art after consideration of the present disclosure.

Figure 1:
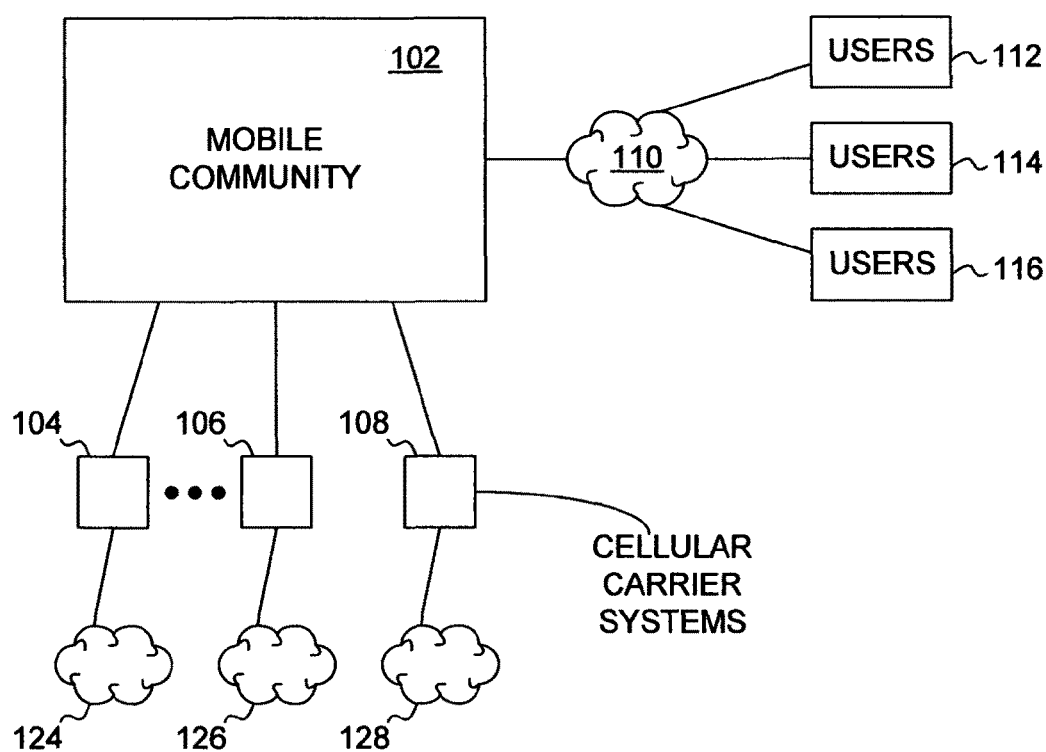
FIG. 1 shows a block diagram of a wireless network environment in which the invention may be practiced, according to an exemplary embodiment of the present invention.

As shown in FIG. 1, the mobile community 102 is accessible to users 112-116 through a medium 110, such as the internet, or to users 124-128 through their respective cellular carrier systems 104-108. In this manner, users of mobile community 102 can access applications and services provided through mobile community 102 either through their mobile devices or through their computer browsers.

Figure 2:
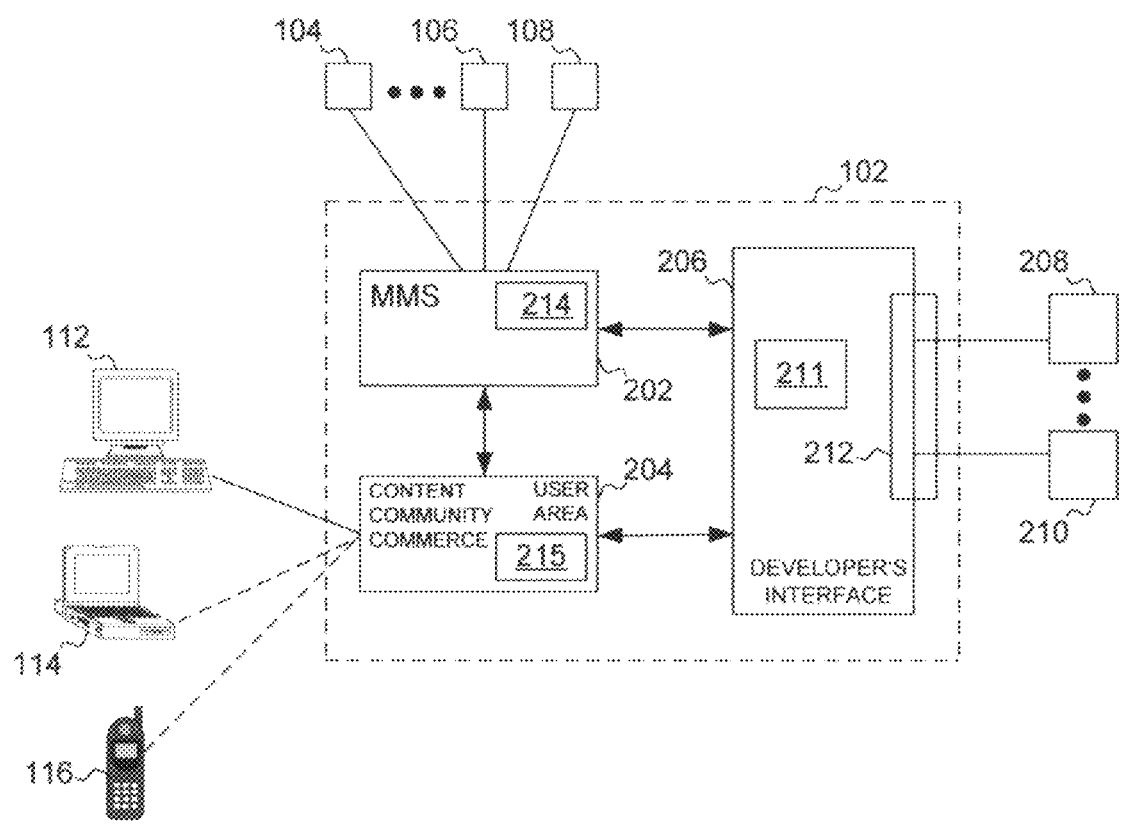
FIG. 2 shows a block diagram providing a detailed view of the platform shown in FIG. 1, according to an exemplary embodiment of the present invention.

FIG. 2 shows a more detailed architecture which allows application developers to register their application pods with the community platform of the mobile community 102 for access, purchase and use by users of mobile community 102. Briefly, mobile community 102 shown in FIG. 2 includes global mobile platform 206, user area 204 where the content, community and commerce functions are handled for the users, and a multimedia messaging system 202 with database 214. Users 112, 114, 116 can visit the user area 204 to participate in an on-line community that includes various content and commerce opportunities. This is typically accomplished via a user's web browser that may be hosted on a laptop or desktop computer, or, in the alternative, even on the user's mobile device such as a PDA or mobile phone. Thus, user area 204 with database 215 includes a web server that communicates with users 112, 114, 116 and includes a data store of user information and other content. With these resources, mobile community 102 presents to a user 112 a profile page ("home page") that reflects content and information associated with, and desired by, that particular user. This content and information is not maintained on the local computer being used by the user 112 but, rather, is maintained and managed by the computer systems within the user area 204.

Multimedia messaging system 202 includes applications for connecting with and communicating with the multiple different cellular carriers 104, 106, 108 that have been partnered with the platform of mobile community 102. MMS 202 is configured to generate message requests in the appropriate format for each of the cellular carriers 104, 106, 108 including tariff information that determines the amount for which the recipient of the message will be charged. Upon receipt of the message request, the cellular carriers 104, 106, 108 will use the information in the request to generate an appropriate message to the intended recipient/subscriber of the cellular carrier and then bill the recipient/subscriber's cellular service account for the specified amount.

MMS 202 communicates with the user area 204, such that users of the mobile community 102 can advantageously use the connectivity of MMS 202 with the carriers in order to send messages to subscribers of any of the cellular carriers 104, 106, 108. The messages may be SMS messages, MMS messages, or other message formats that are subsequently developed. Some of these messages may have zero tariff and, therefore do not generate a bill (other than the underlying charges implemented by the cellular carrier) and others may have non-zero tariffs resulting in a billing event for the recipient. Mobile users can also communicate via MMS 202 with user area 204 to access the content, community and commerce offered though mobile community 102.

Global mobile platform 206 provides a link between software developers/providers 208, 210 and mobile community 102. In particular, by using an interface 212, a software provider 208, 210 may offer services and products to users 112, 114, 116. Advantageously for the software provider 208, 210, the global mobile platform 206 also provides automatic and instant connectivity to the MMS 202 and the cellular carriers 104, 106, 108, and their users. Accordingly, the software provider 208, 210 can interact with all users of the mobile community 102 whereby billable transactions with users 112, 114, 116 are automatically billed via the billing systems of the cellular carriers 104, 106, 108. Furthermore, and importantly, this capability is available to the software provider 208, 210 without requiring the software provider 208, 210 to negotiate or contract with any cellular carrier for billing arrangements, or to worry about how to communicate with a cellular carrier's systems and resources. The software provider seamlessly takes advantage of the unified set of connectivity and billing arrangements that exist between the mobile community 102 and the cellular carriers 104, 106, 108. Thus, in addition to the contractual arrangements and affiliations the mobile community 102 has in place with different carriers 104, 106, 108, the underlying technical and communications infrastructure is also in place to communicate with and interoperate with each of the different carriers 104, 106, 108. As a result, application pod vendors and other members of the mobile community may interface with and operate with any of a variety of different carriers without difficulty. While some applications that are available to users 112, 114, 116 may be hosted in the user area 204, the global mobile platform 206, or elsewhere in the community 102, it is often the case that the developer/provider 208, 210 will host their own application at their own remote location. As is shown in the example of FIG. 2, users 112, 114 and 116 may be connected to mobile community 102 through various means, including but not limited to, desktop, laptop and mobile device, respectively. Other medium of communication are also possible and within the scope of the present invention.

Figure 3:
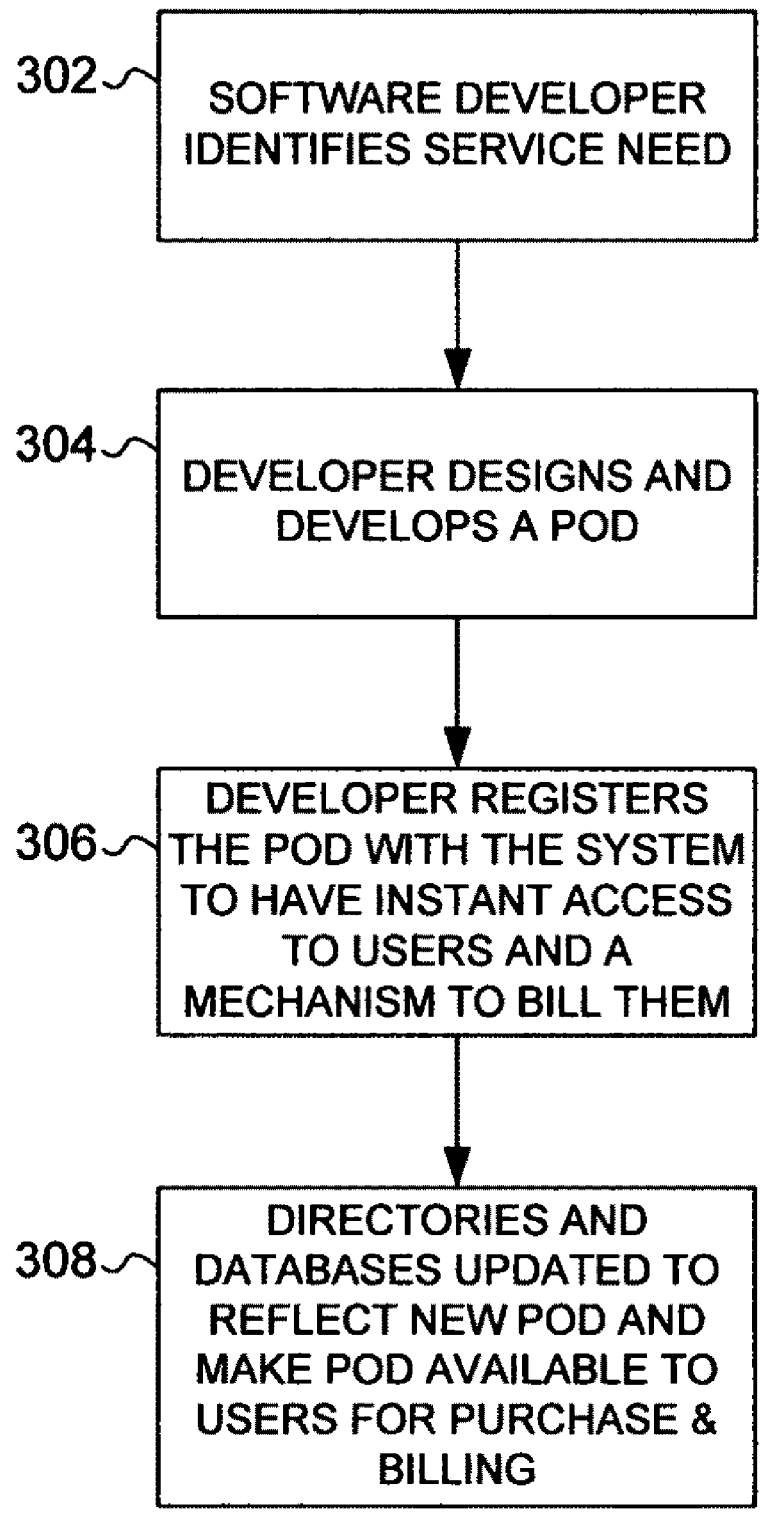
FIG. 3 shows a flowchart for showing the integration of a network-enabled application, according to an embodiment of the present invention.

FIG. 3 shows a flowchart with the basic steps through which an application pod developer takes advantage of the community and billing resources offered by the mobile community. First, the application developer identifies a service need (such as a stock price information service, for example) in step 302, and then the application developer designs and develops an application pod for the desired service (step 304). In step 306, the developer registers the pod with the community through global mobile platform 206 to make the pod available to users of mobile community 102 for purchase and use. Once registered, the system databases and directories of mobile community 102 are updated to accommodate the new pod for access, billing, and other purposes (step 308).

Figure 4:
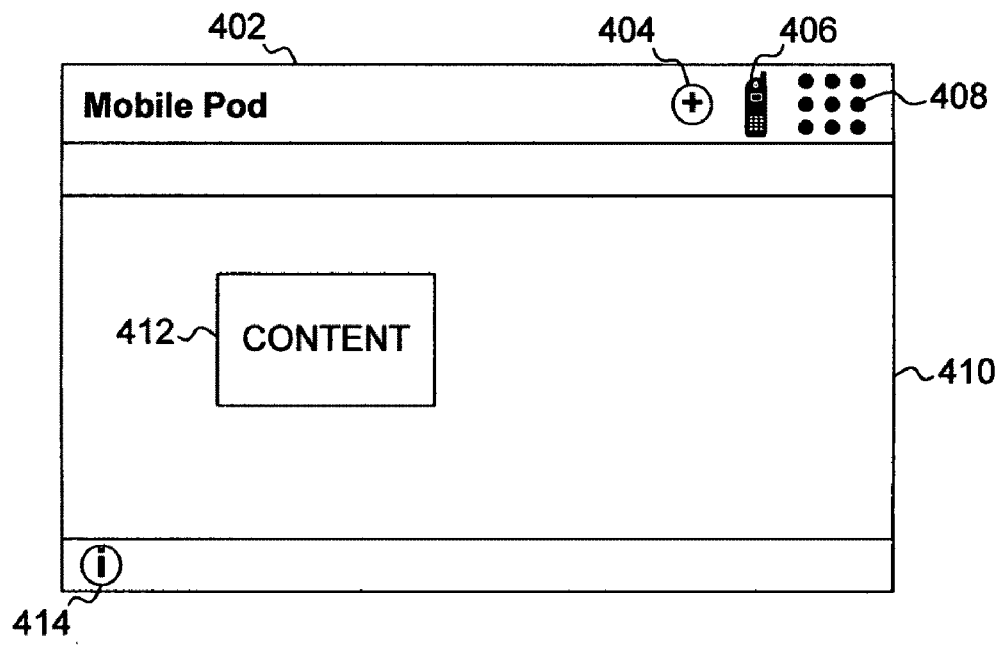
FIG. 4 shows a block diagram depicting an application, according to an exemplary embodiment of the present invention.
Figure 5:
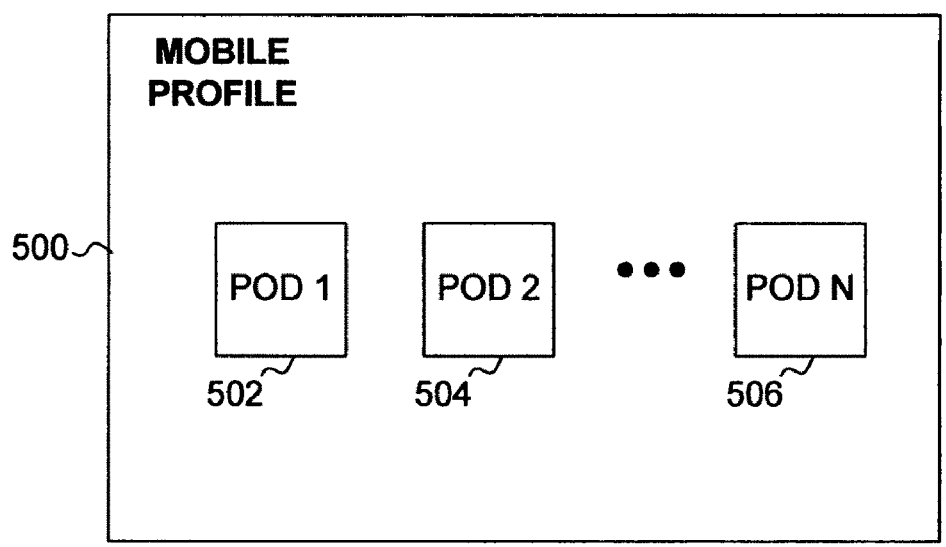
FIG. 5 shows a block diagram depicting a profile webpage, according to an exemplary embodiment of the present invention.

An example of an application pod developed by a developer and registered with mobile community 102 is shown in FIG. 4, and a depiction of a user's home page is shown in FIG. 5, in which it can be seen that the user's home page contains several application pods to which the user has subscribed.

FIG. 4 shows a rendering of an exemplary pod 400. The pod includes a title bar 402 with a number of icons 404-408. The main window 410 of the pod is where the content 412 is displayed. This content is based on the associated application and the stored system information associated with this pod. From the pod 400, a user launches an initial message to the associated application. In instances where the application provides content back to the pod 400, the window 410 is updated. By using remote scripting capability, as is known in the art, the updating of window 410 can occur without the user manually refreshing the window 410. The pod 400 can be designed to provide different views of content 412 to a user depending on whether the user is an "owner" or a "viewer".

FIG. 10 shows an exemplary user profile page 500 that has arranged thereon a plurality of applications 502, 504, 506. In this manner, the pods available to a user can be displayed on their profile page. As noted earlier, the user can access this profile page via a number of different devices and/or networks. For example, in addition to use of a traditional web browser, a portable device such as a smart phone or PDA can be used to access the profile page and pods. Such portable devices can utilize traditional WAP-based or HTML-based network connection techniques to access the pods through a network, such as a local intranet or a wide area network such as the internet, but they may also utilize device-based applications with proprietary network protocols specifically developed to advantageously utilize the capabilities provided by pods and applications. For example, according to one embodiment of the present invention, an ad-hoc wireless network created on-the-fly between the mobile devices of several users may be used to share profile pages and/or pods without relying upon a web-based network. In such an embodiment, one mobile user may be able to access a pod hosted on the mobile device of another user. As will be apparent to one of skill in the art, the scope of the present invention is not limited to the particular networks and/or devices described above, but rather includes any network-enabled device and any network connection technique used to connect such a network-enabled device to any type of network.

As mentioned above, the present invention of this application is directed to adding to the platform and methods described in the parent application, in order to automatically generate an application pod for a third party through which the third party's content is offered for access, purchase and use by mobile phone users within a community network. In this manner, the third party does not need to have the requisite skills and capabilities, time or resources to develop an application pod through which to offer the third party's content, such as a blog, music, video, text, or other digital content, to mobile phone users within the community network.

Figure 6A:
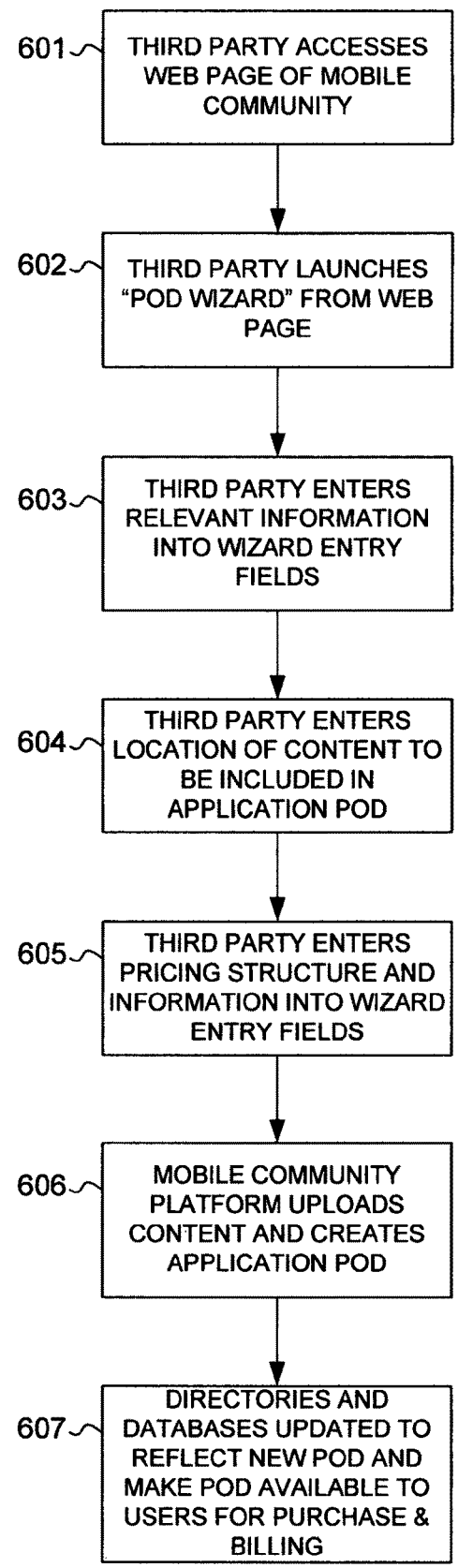
FIG. 6A shows a flowchart of a method for introducing an application pod, according to an exemplary embodiment of the present invention.

FIG. 6A shows a flowchart which depicts an exemplary method of the present invention in which a third party can offer their content through the mobile community through an application pod that is automatically generated within the mobile community at the request of the third party. This process is shown as being communicated through a web page, but other routes can also be used, including but not limited to desktop applications, mobile applications and the like. The steps would be substantially the same and any differences would be apparent to one having ordinary skill in the art.

Turning to step 601 of FIG. 6A, a third party with content first accesses a web page provided by the mobile community to allow third parties to have an application pod automatically generated to offer their content for access, purchase and use by users of the mobile community. In step 602, the third party launches an application, or "wizard", from the web page in order to begin the process of automatically generating an application pod for the third party. It can be appreciated that the wizard can be a series of web pages, a single web page, a program or applet, or other known method for entering information remotely via a network to a server. In step 603, the third party enters relevant information into provided wizard entry fields. Such requested information can vary according to the type of content that the third party will be offering through the application pod. For example, the third party can be required to enter their name and contact information, with a description of the content they are offering. It can also be required for the third party to indicate the language in which the content is offered, and other information about the third party or author of the content, such as biographical information, history of development of other content by the third party, and other relevant information such as calendar events related to the third party (e.g. speaking engagements, appearances, etc.).

In step 604, the third party enters the location of the content that is to be contained in the application pod into a provided wizard entry field. This can be a file location on the user's computer, and can be obtained through a browse button provided in the wizard page. Also, the location can be a remote location, such as a URL address of a blog site on which the third party maintains a blog. In this exemplary embodiment, wizard entry fields are provided for indicating the blog site (by name or URL address), and the user ID and the password of the third party for the blog site. Also, the entry fields are provided in the wizard for the third party to provide a unique blog name, and descriptions (short and long descriptions), as well as a location of logo graphic that is to be used in the mobile community in association with the application pod.

In step 605, the third party enters the desired pricing structure and pricing information for the pod. The wizard provides entry fields for the third party to set the price that is charged to the user for subscribing to the pod, and also may allow the third party to send messages related to the subscribing users that are related to the application pod content. For example, in the case of a blog application pod, the wizard entries allow the third party to set the price that is billed to the user (via the user's cellular carrier as more fully described in the parent application). In addition, the wizard provides entry fields to allow the third party to set a number of messages per day that can be sent by the third party to the subscribers of the application pod, and a price level for each message that is sent to a subscriber. In the case of a blog application pod, the third party can send messages to the subscriber to alert the subscriber that a new entry has been added to the blog. The third party then is able to review a representation of the appearance of the application pod before finally submitting the wizard entries for creation of the pod.

Next, in step 606, the mobile community, through a server and computing devices, uploads the content from the content location provided by the third party in the wizard entries, and then creates an application pod which contains the uploaded content. The application pod is preferably created using a set of predetermined graphic functions and software functions to implement the pod frame and the functions commonly associated with a pod provided through the mobile community. Such preferable graphics and functions are apparent to one having ordinary skill in the art after consideration of the present disclosure. These graphic and software functions used to create and support the application pod also provide community functions through which a user of the application pod can interact with other members of the mobile community regarding the application pod, and are discussed more fully below.

Once the application pod is created, the directories and databases of the mobile community are updated to implement the application pod and make it accessible to users of the mobile community for purchase, upon which the user is billed through the existing billing system of the user's respective cellular carrier, as described fully in the parent application. A user who has not purchased the application pod can see a limited view ("public view") of the application pod, while a user who has purchased the pod can view the entire pod content ("private view"). For example, in the case of a blog application pod, the public view of the application pod may only show the last blog entry, or may only show a limited amount of blog entry text, whereas users who have purchased the blog pod can view all entries in the blog via the private view of the pod.

Figure 6B:
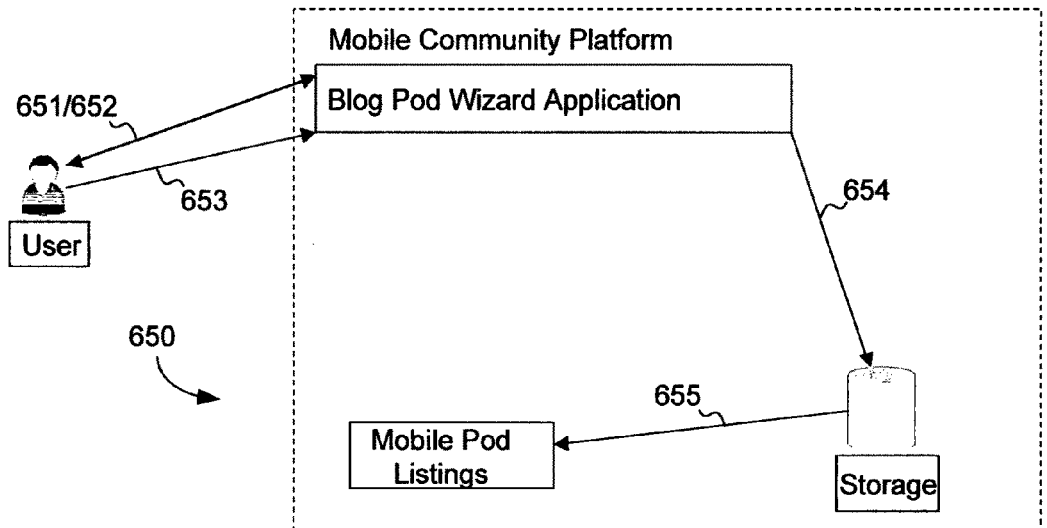
FIGS. 6B and 6C show a schematic diagram of a user following part of the process shown in FIG. 6A, according to an exemplary embodiment of the present invention.
Figure 6C:
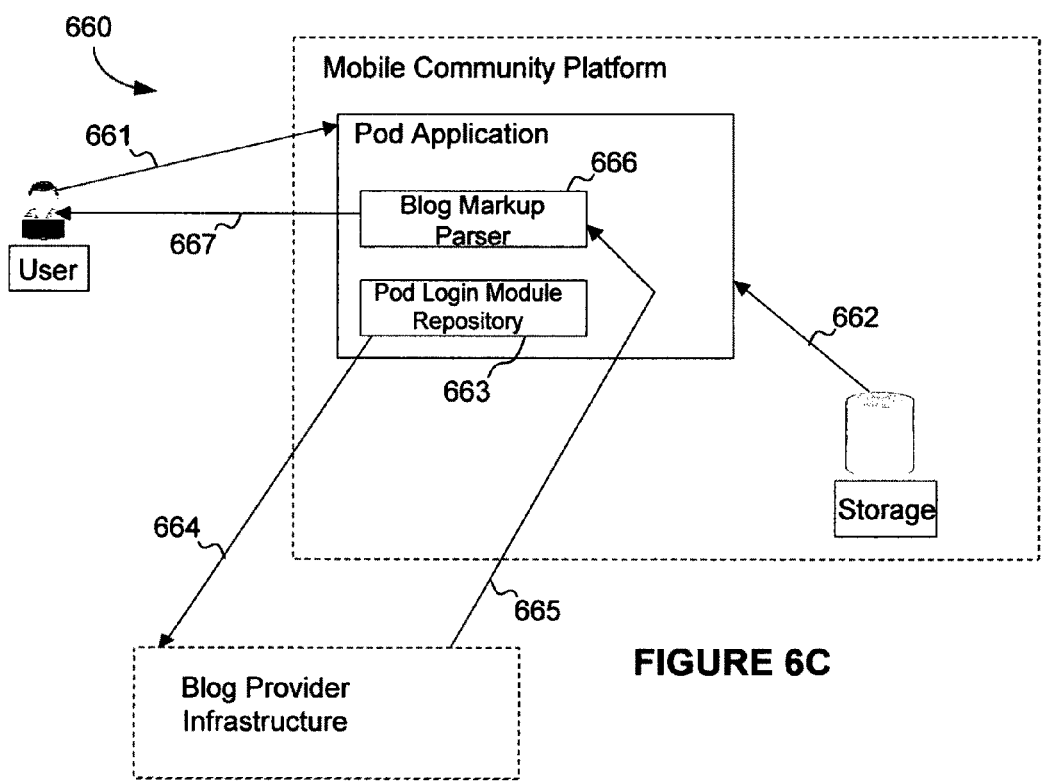

FIGS. 6B and 6C show a schematic diagram of part of the process that is shown in FIG. 6A. In FIG. 6A, the process of creation of a blog pod through the blog wizard is shown from a system perspective. In step 651, the launch pod wizard application is initiated through various communication processes, including, for example, telephone, web, desktop applications, and the like. At step 652, various information is entered into the wizard (see FIG. 7A). In step 653, the user submits information to the mobile community platform. Step 654 shows the process where the information is stored into the mobile community platform. Step 655 shows that the community is then given the access to purchase the newly created pod via the mobile pod listings (for example, in a mobile directory web page).

Once the pod is listed on the mobile pod listings and made available to the community, a user may view the blog pod, as shown in system diagram 660 of FIG. 6C. Here, the user can launch a blog pod application in step 661 by passing the mobile community platform user credentials. This again, could be through various communication paths, including telephone, web, desktop applications, and the like. At step 662, based on the credentials the mobile community platform pulls from storage, which could include blog provider, blog account name and password, the mobile community platform loads the module for accessing the blog based on the blog provider, as shown in step 663. These blog information modules may rest on third party sites until the point where some interest is shown in the blog by a user, at which point the blog pod is uploaded into the central mobile community platform. The module posts blog account name and blog account password to blog provider at step 664. Such blog provider infrastructure can exist outside of mobile community platform. The blog provider can then respond, as shown in step 665, to post with markup text such as HTML response through provider web page, or XML response through blog provider web service. The mobile community platform parses mark up the text from the blog provider for blog information, as shown in step 666. At this step, shown as 667, the mobile community platform can then shown the user the blog information. Other system methods may also be followed, such other system methods still being within the scope of the present invention.

Figure 7A:
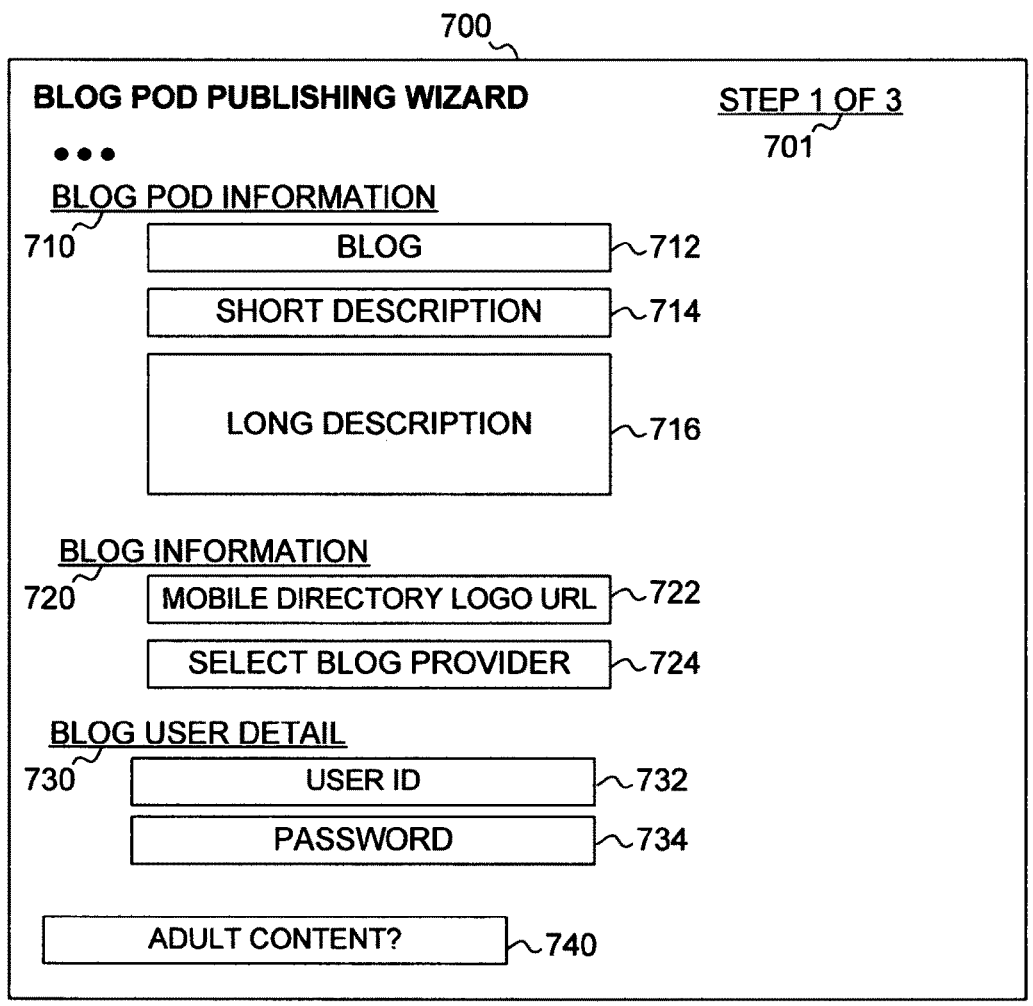
FIGS. 7A-7C show various steps within an application pod wizard, according to an exemplary embodiment of the present invention.
Figure 7B:
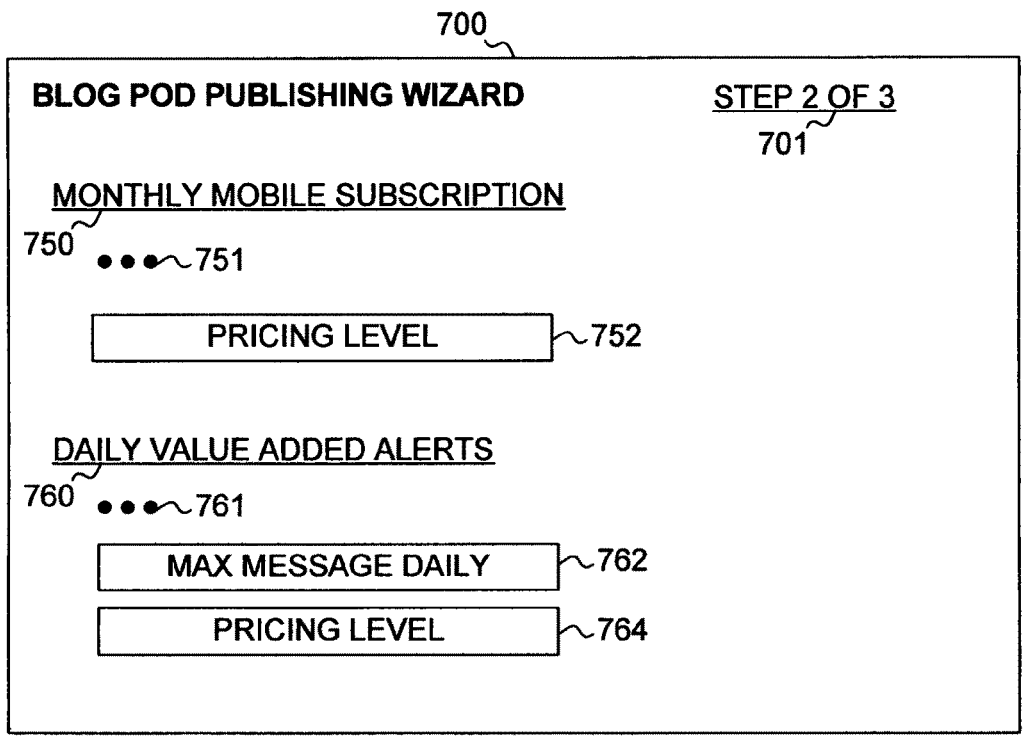
Figure 7C:
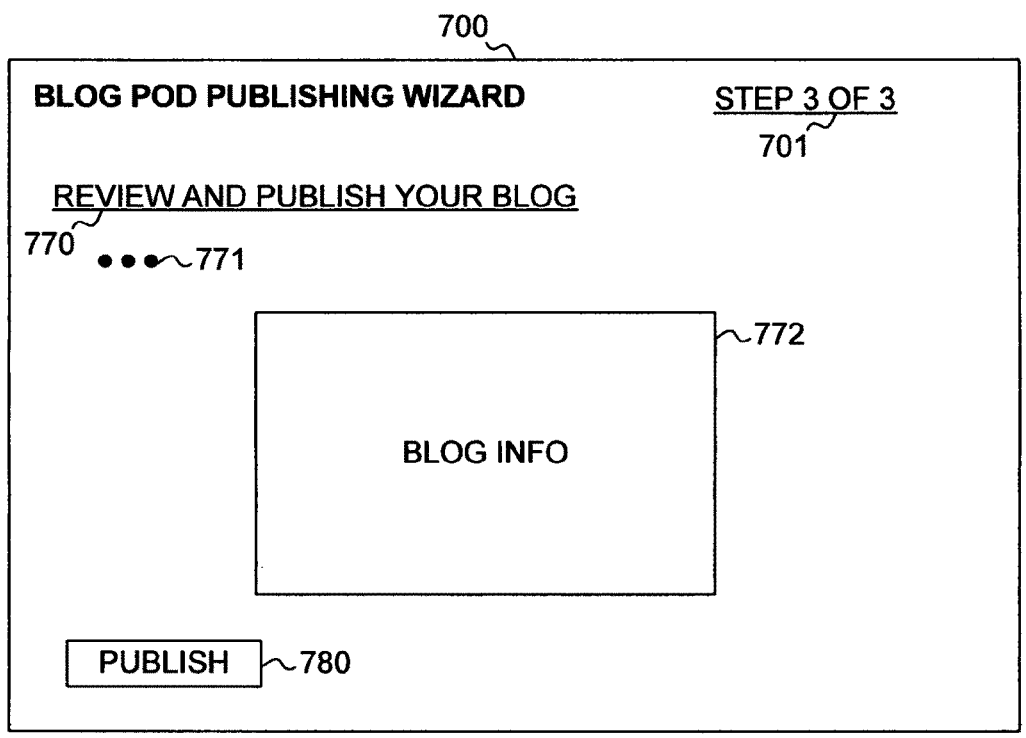

FIGS. 7A-7C present exemplary screen shots of various steps 701 of a wizard 700 for automatically creating an application pod for a third party to offer a blog by the third party to users of the mobile community. As seen in FIG. 7A, the wizard 700 includes entry fields for entering the blog pod information 710, 712 and user detail 730, including blog name 712, a short 714 and a long 716 description of the blog, and a mobile directory logo URL 722 to indicate the location of the logo that the third party wants associated with the blog application pod. Also provided in the wizard are entry fields for the user to indicate the blog provider 724, and the user ID 732 and password 734 of the third party for the blog, so that it can be accessed and uploaded to the application pod. Also included is an indicator 740 of whether the content of the blog will contain adult material.

FIG. 7B shows another wizard page for automatically creating a blog application pod to obtain information about monthly mobile subscription 750 and daily value added alerts 760, and associated instructions 751 and 761, respectively. An entry field 752 is provided for the third party to enter the price level that is to be charged to a user to subscribe to (purchase) the pod. Also provided are entry fields for the third party to set a maximum number of messages per day 762 that can be sent by the third party to the subscribers of the application pod through the mobile community platform, and a price level for each message 764 that is sent to a subscriber. As mentioned above, in the case of a blog application pod, the third party can send messages to the subscriber to alert the subscriber that a new entry has been added to the blog.

FIG. 7C shows a further wizard page 770 with instructions 771 for automatically creating a blog application pod in which a representation of the appearance of the application pod is depicted for the user 772, along with pricing information, before finally submitting the wizard entries for creation of the application pod through a confirmation command 780. If errors are present, or the third party wants to change the pod appearance or any pod related information, the third party can navigate back through the wizard to correct the necessary field entries.

Figure 8:
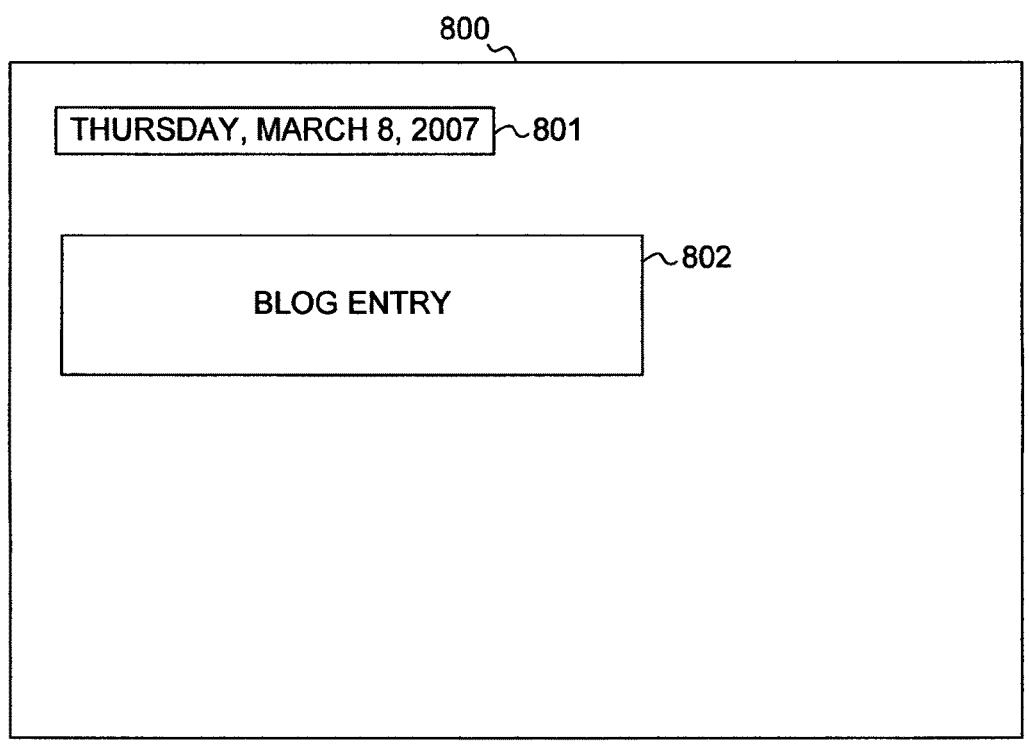
FIG. 8 shows a sample blog made possible by an introduced application pod, according to an exemplary embodiment of the present invention.

FIG. 8 depicts an example of a blog application pod 800 created from the wizard steps discussed above. The outer frame of the application pod, and associated functionality, is generated by predetermined sets of graphic and software functions, and the inner windows 801 and 802 is used to display the content that is uploaded from the location provided by the third party user. As seen in the blog pod shown in FIG. 8, a blog entry 802 is displayed, and navigation tags (not shown) are provided for the user of the blog pod to navigate to previous and subsequent blog entries.

In addition, community-based functionality can be implemented into the pod frame via menus, which allow the user to comment on the blog pod, share the blog pod with others, rate the blog pod, see other community users who have purchased the blog pod, see a list of other recommended application pods based on other users who have purchased the blog application pod, and obtain information about the third party that generated the application pod, and possibly contact the third party about the application pod. Such community-based functions would be helpful for rating the pod or gathering further information about users for the pod.

According the above invention, an application pod is automatically generated for a third party to offer content for access, purchase and use by mobile phone users within a community network. In this manner, the third party does not need the requisite skills, capabilities, time or resources to develop an application pod for delivery of the content to users of the community network. The third party can thereby easily take advantage of the automatic connection to community users and of the automatic billing through the users' respective cellular carriers.

Although the above examples have been presented with respect to a pod application being a blog, the present invention is not limited to a blog, and may be any other application that could be used in the architecture and process as presented herein. Other non-limiting examples of pod applications include, but are not limited to, flash applications, mobile applications, "widget"-type applications and the like. Future applications, not yet described or known, which can also benefit from the present invention, are also within the scope of the present invention.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for automatically presenting an application to a network platform, the method comprising:
    a user area establishment step of establishing, on a network platform comprising one or more servers, a user area associated with a user;
    an application access step of making an application available in or through the network platform via the user area, the application access step comprising
        receiving information related to the application from a third party through a developer interface, wherein the third party is different than the user,
        receiving a remote location of content associated with the application from the third party through the developer interface, wherein the remote location is not the network platform,
        receiving pricing information related to the application from the third party through the developer interface,
        automatically creating the application based on the information received from the third party, and
        updating a directory and a database so that the created application is available through the network platform to a plurality of users; and
    a user access step of, by the network platform,
        retrieving the content from the remote location, and
        displaying the application, including the content, via the user area on the network platform.

2. The method of claim 1, wherein the plurality of users have full or limited access to the application, depending on pre-set conditions.

3. The method of claim 2, wherein a pre-set condition is whether a particular user has paid to join a list of member users of the application.

4. The method of claim 1, wherein the remote location of the content is identified by a Universal Resource Locator (URL).

5. The method of claim 1, further comprising detecting a billing event generated when a user accesses the application or a billable feature within the application and sending a billing message to a cellular carrier associated with the user in response to the detected billing event.

6. The method of claim 1, further comprising:
    establishing, on the network platform, a second user area associated with the third party; and
    by the network platform,
        retrieving the content from the remote location, and
        displaying the application, including the content, via the second user area on the network platform.

7. A community platform system, comprising:
    a server comprising a processor and a memory;
    a user area hosted on the server configured to include a plurality of user areas associated with a plurality of users, the user areas configured to allow a user to access and use a plurality of application pods on or through a community platform;
    a directory hosted on the server configured to include information related to the plurality of application pods, the information enabling the plurality of users to access the plurality of application pods;
    a database configured to store the plurality of application pods;
    a plurality of functions hosted on the server and configured to create and support an application pod;
    a developer interface hosted on the server and configured to allow a third party to interface with the community platform using a computer and to create an application pod and make the application pod available to the plurality of users;
    a pod wizard hosted on the server interfaced with the directory, database, plurality of functions, and developer interface, the pod wizard configured to receive information related to an application pod to be created from a third party through the developer interface, receive a remote location of content associated with the application pod to be created from the third party through the developer interface, wherein the remote location is not the server, receive pricing information related to the application pod to be created from the third party through the developer interface, automatically create the application pod to be created based on the information received from the third party, and update the directory and the database so that the created application pod is available to the plurality of users; and at least one module configured to
retrieve the content from the remote location, and
display the application pod, including the content, via one or more of the plurality of user areas.

8. The community platform system of claim 7, wherein the application pod to be created is one of the following: a blog, a flash application, a mobile application, and a widget.

9. The community platform system of claim 7, further comprising a ratings application, wherein the ratings application is configured to allow the plurality of users to rate the created application pod.

10. The community platform system of claim 7, wherein the community platform is configured to allow the plurality of users to have full or limited access to the created application pod, depending on pre-set conditions.

11. The community platform system of claim 10, wherein a pre-set condition is whether a particular user has paid to join a list of member users of the created application pod.

12. The community platform system of claim 7, wherein the plurality of users each access the created application pod through a mobile device.

13. The community platform system of claim 12, wherein the mobile device is a mobile telephone.

14. The community platform system of claim 7, wherein the plurality of users access the platform through the web.

15. The community platform system of claim 7, wherein the pod wizard comprises at least one of a series of web pages, a single web page, a program, and an applet.

16. The community platform system of claim 7, wherein the information related to the application pod to be created is specific to the type of content associated with the application pod to be created.

17. The community platform system of claim 7, wherein the information related to the application pod to be created includes a name and contact information.

18. The community platform system of claim 7, wherein the information related to the application pod to be created includes a description of the content.

19. The community platform system of claim 7, wherein the information related to the application pod to be created includes a language associated with the content, the application pod, or both.

20. The community platform system of claim 7, wherein the information related to the application pod to be created includes information related to the third party.

21. The community platform system of claim 20, wherein the information related to the third party includes at least one of biographical information, history of development, and calendar of events.

22. The community platform system of claim 7, wherein the remote location of the content is identified by a Universal Resource Locator (URL).

23. The community platform system of claim 7, wherein the pod wizard is configured to automatically create the application pod using a plurality of functions including graphic functions.

24. The community platform system of claim 7, further comprising a billing function configured to detect a billing event generated when a user accesses the created application pod or a billable feature within the application pod, and to send a billing message to a cellular carrier associated with the user in response to the detected billing event.

25. The community platform system of claim 7, wherein the pricing information includes a price to be billed to a user for access to the application pod.

26. The community platform system of claim 25, wherein the price is billed to the user as part of a bill for cellular service generated by a cellular carrier associated with the user.

27. The community platform system of claim 25, wherein the price is billed to the user is a non-zero price.

28. The community platform system of claim 7, wherein at least one of the plurality of user areas is associated with the third party, the user area configured to allow the third party to access and use a plurality of application pods on or through the community platform.

* * * * *